United States Patent
Oemke et al.

(10) Patent No.: US 8,826,645 B2
(45) Date of Patent: Sep. 9, 2014

(54) HYDROCARBON CONVERSION DIAGNOSTIC

(75) Inventors: Rebecca A. Oemke, Plymouth, MI (US); Steve L. Melby, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 692 days.

(21) Appl. No.: 13/045,620

(22) Filed: Mar. 11, 2011

(65) Prior Publication Data

US 2012/0227380 A1    Sep. 13, 2012

(51) Int. Cl.
| | |
|---|---|
| *F01N 3/00* | (2006.01) |
| *F01N 11/00* | (2006.01) |
| *F01N 13/02* | (2010.01) |
| *F01N 9/00* | (2006.01) |
| *F01N 3/025* | (2006.01) |
| *F01N 3/10* | (2006.01) |

(52) U.S. Cl.
CPC ............ *F01N 13/02* (2013.01); *F01N 2610/03* (2013.01); *F01N 11/002* (2013.01); *F01N 2560/06* (2013.01); *F01N 2900/1602* (2013.01); *F01N 9/002* (2013.01); *Y02T 10/47* (2013.01); *F01N 2550/24* (2013.01); *F01N 3/0253* (2013.01); *F01N 11/005* (2013.01); *F01N 3/106* (2013.01)
USPC .................... 60/285; 60/274; 60/286; 60/295

(58) Field of Classification Search
CPC ..... F01N 11/002; F01N 11/005; F01N 13/02; F01N 3/0253; F01N 3/106; F01N 9/002; F01N 2560/06; F01N 2610/03; F01N 2900/1602; Y02T 10/47
USPC ............................ 60/274, 286, 295, 297, 311
See application file for complete search history.

(56) References Cited

U.S. PATENT DOCUMENTS

| | | | |
|---|---|---|---|
| 5,050,376 A | 9/1991 | Stiglic et al. | |
| 6,145,302 A * | 11/2000 | Zhang et al. | 60/274 |
| 6,463,732 B2 * | 10/2002 | Baeuerle et al. | 60/274 |
| 7,048,891 B2 * | 5/2006 | Kinugawa et al. | 422/94 |
| 2006/0225492 A1 * | 10/2006 | Pfister | 73/118.1 |
| 2009/0158716 A1 * | 6/2009 | Tsukamoto et al. | 60/295 |
| 2009/0235645 A1 * | 9/2009 | Noda | 60/285 |

FOREIGN PATENT DOCUMENTS

| | | |
|---|---|---|
| DE | 10227838 A1 | 1/2003 |
| DE | 102005015998 A1 | 10/2006 |

* cited by examiner

*Primary Examiner* — Thomas Denion
*Assistant Examiner* — Matthew T Largi
(74) *Attorney, Agent, or Firm* — Quinn Law Group, PLLC

(57) ABSTRACT

A system includes an engine configured to operate in a first operating state and a second operating state, a particulate filter configured to receive exhaust gas from the engine and filter particulate matter from the exhaust gas, and an oxidation catalyst configured to generate heat to increase a temperature of the exhaust gas during a regeneration process. A sensor is configured to measure an actual temperature of the exhaust gas during the regeneration process. A controller is configured to define a fuel conversion factor based, at least in part, on the actual temperature and an expected temperature of the exhaust gas. The controller is further configured to analyze the fuel conversion factor over time relative to at least one of the first and second operating states of the engine and diagnose a fault in the regeneration process based, at least in part, on the fuel conversion factor.

12 Claims, 1 Drawing Sheet

HYDROCARBON CONVERSION DIAGNOSTIC

TECHNICAL FIELD

The disclosure relates to a diagnostic for hydrocarbon conversion.

BACKGROUND

Passenger and commercial vehicles that use diesel engines may use a diesel particulate filter (DPF), a diesel oxidation catalyst (DOC), or both, to reduce emissions caused by exhaust gases. The diesel particulate filter is used to filter soot from the exhaust gases, while the diesel oxidation catalyst oxidizes the exhaust gases to reduce emissions. A regeneration process is used to remove the soot that collects on the diesel particulate filter.

SUMMARY

An example system includes an engine configured to operate in a first operating state and a second operating state, a particulate filter configured to receive exhaust gas from the engine and filter particulate matter from the exhaust gas, and an oxidation catalyst configured to generate heat to increase a temperature of the exhaust gas during a regeneration process. A sensor is configured to measure an actual temperature of the exhaust gas during the regeneration process. A controller is configured to define a fuel conversion factor based, at least in part, on the actual temperature and an expected temperature of the exhaust gas. The controller is further configured to analyze the fuel conversion factor over time relative to at least one of the first and second operating states of the engine and diagnose a fault in the regeneration process based, at least in part, on the fuel conversion factor.

An example method includes determining an actual temperature of exhaust gas during a regeneration process, determining an expected temperature of the exhaust gas, defining a fuel conversion factor based on the actual temperature and the expected temperature, identifying an operating state of an engine, and analyzing the fuel conversion factor over time relative to the identified operating state. The method further includes diagnosing a fault in the regeneration process based at least in part on the fuel conversion factor.

The above features and the advantages of the present disclosure are readily apparent from the following detailed description of the best modes for carrying out the invention when taken in connection with the accompanying drawings.

DETAILED DESCRIPTION

As described in greater detail below, a system has a controller that is able to compensate for changes in operating states of an engine in real time during a regeneration process. For instance, the controller may define a fuel conversion factor that may be analyzed in light of the different operating states of the engine to diagnose regeneration process failures. The system may take many different forms and include multiple and/or alternate components and facilities. While an example system is shown in the Figures, the components illustrated in the Figures are not intended to be limiting. Indeed, additional or alternative components and/or implementations may be used. For example, although the system is described in the context of a regeneration process used with a diesel engine, the system may be used during a regeneration process of any type of direct injection fuel system.

Figure 1:
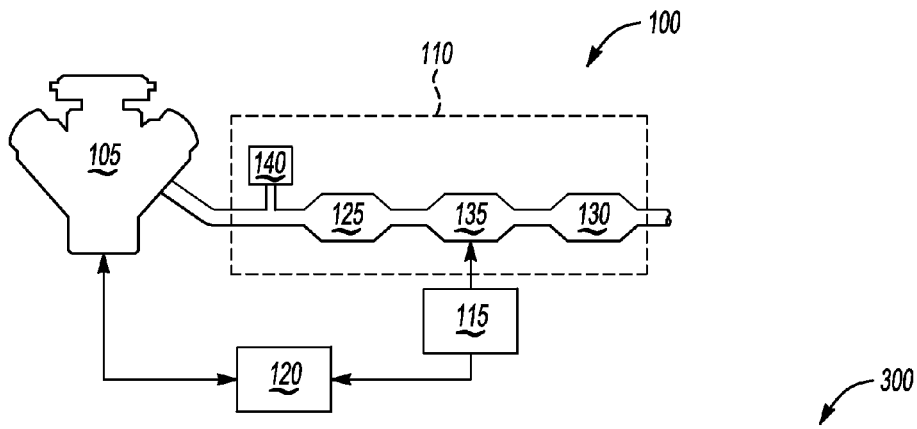
FIG. 1 is a schematic diagram of an example vehicle configured to diagnose a fault during a regeneration process.

FIG. 1 illustrates an example system 100 that includes an engine 105, an exhaust system 110, one or more sensors 115, and a controller 120. The system 100 may be used in a vehicle, such as any passenger or commercial automobile, aircraft, train, bus, truck, motorcycle, etc., or any other vehicle having a direct-injection fuel system. The system 100 may alternatively be used in other applications where, e.g., a regeneration process is used to remove soot from the exhaust system 110.

The engine 105 may include any device configured to generate motion from a fuel. For instance, the engine 105 may be a compression-ignition (e.g., diesel) engine configured to combust diesel fuel. In one possible approach, the engine 105 may include a piston (not shown) disposed within a chamber (not shown). The piston may compress the fuel inside the chamber when the piston is near a top dead center position, and the compression of the fuel may cause the fuel to combust. The energy released during combustion may force the piston toward a bottom dead center position within the chamber. The translating motion of one or more pistons in the engine 105 between the top dead center position and the bottom dead center position may cause a crankshaft (not shown) connected to the pistons to rotate. The rotation of the crankshaft may generate a torque that can be used to propel the vehicle. The engine 105 may combust the fuel according to any thermodynamic cycle, such as the Diesel cycle.

In one possible approach, the engine 105 may operate in a plurality of operating states, including a first operating state and a second operating state. The engine 105 may be configured to transition between any number of operating states during the same or different key cycles. As discussed below, the "first operating state" may refer to one or more high exothermic states where the engine 105 may generate an increased amount of exhaust gas based on the amount of work performed by the engine 105. Accordingly, the engine 105 may operate in the first operating state when, e.g., travelling uphill, travelling at high speeds, pulling a trailer, etc. The "second operating state" may refer to one or more low exothermic states of the engine 105 that may be caused by a decrease in work performed by the engine 105 under certain circumstances such as coasting downhill, travelling at low speeds, etc. When operating in the second operating state, the engine 105 may generate less exhaust gas than when in the first operating state. As discussed in greater detail below, the amount of exhaust gas produced by the engine 105 may affect the success of a regeneration process.

The exhaust system 110 may include any number of devices configured to allow exhaust gas to flow out of the engine 105. That is, the engine 105 may generate exhaust gases as part of the combustion process described above. The exhaust system 110 may include, e.g., tubing or pipes that guide the exhaust gases out of the engine 105. The exhaust system 110 may further include various components that may be used to reduce emissions caused by the exhaust gases. For instance, the exhaust system 110 may include an oxidation catalyst 125, a particulate filter 130, and in some instances, a catalytic reduction 135. The oxidation catalyst 125 may include any device, such as a diesel oxidation catalyst (DOC), configured to use a chemical process to break down compounds in the exhaust gases. The oxidation catalyst 125 may use a catalyst such as palladium and/or platinum to reduce the particulate matter, hydrocarbon-based soluble organic fraction (SOF), and carbon monoxide content of exhaust gas by oxidation. The particulate filter 130 may include any device, such as a diesel particulate filter (DPF), configured to filter particulate matter or soot from the exhaust gas. The catalytic reduction 135 may include any device, such as a selective catalytic reduction (SCR), configured to reduce emissions in exhaust gas using, e.g., a reductant and a catalyst. The reductant may include any reducing agent that donates an electron (e.g., oxidizes) during a chemical reaction. For instance, the reductant may include one or more of anhydrous ammonia, aqueous ammonia, and urea. The catalyst may include any substance that participates in a chemical reaction without being consumed during the chemical reaction. The catalyst may include, for example, titanium oxide, vanadium, tungsten, zeolites, etc. As the exhaust gas passes through the catalytic reduction 135, compounds in the exhaust gas may be converted into other compounds. For instance, Nitrous Oxide (NOx) may be converted into diatomic nitrogen ($N_2$) and water ($H_2O$).

During the operation of the engine 105 and the exhaust system 110, particulate matter may collect on the particulate filter 130 and limit the ability of the exhaust system 110 to reduce emissions and/or allow exhaust gas to flow out of the engine 105. Thus, a regeneration process may be used to remove the particulate matter so that the particulate filter 130 may continue to filter the exhaust gas. The regeneration process may include increasing the temperature of the exhaust gas provided to the particulate filter 130 to a level sufficient to burn off the collected particulate matter. Accordingly, in one possible implementation, the regeneration process may include injecting hydrocarbons into the oxidation catalyst 125 using an injector 140. The amount of hydrocarbons that may be provided by the injector 140 may be based on various factors such as, e.g., the speed of the engine 105, an ambient air temperature, a mass flow rate of the exhaust gas, a quantity of airflow through the engine 105, etc. As the hydrocarbons oxidize, heat is generated. The heat generated by the oxidation catalyst 125 plus the heat of the exhaust gas from the engine 105 may increase the temperature of the particulate filter 130 to a level sufficient to burn off the particulate matter collected on the particulate filter 130. Other regeneration techniques may be used in addition or as an alternative to the regeneration process described above.

The sensors 115 may include any device configured to measure, e.g., a temperature of the exhaust gas at one or more locations in the exhaust system 110. Accordingly, the sensor 115 may include a thermometer. The sensor may also be configured to generate and output a temperature signal representing the actual temperature measured either continuously or when commanded to do so, such as during the regeneration process. Although only one sensor 115 is shown, the system 100 may include any number of sensors 115. For example, sensors 115 may be used to measure the temperature of the exhaust gas provided to the oxidation catalyst 125, the catalytic reduction 135, the particulate filter 130, etc.

The controller 120 may include any device configured to determine whether the regeneration process was properly executed based on the temperature of the exhaust gas provided to the particulate filter 130 either directly from the oxidation catalyst 125 or from the catalytic reduction 135. That is, the controller 120 may be configured to diagnose a fault in the regeneration process by analyzing a fuel conversion factor, which may be a number representing the effectiveness of the oxidation catalyst 125 to increase the temperature of the exhaust gas. In one example implementation, the controller may be configured to analyze the fuel conversion factor over time (e.g., during the regeneration process) given the various operating states (e.g., the first operating state and the second operating state) of the engine 105 to diagnose a fault in the regeneration process. The controller 120 may be implemented as part of an engine control module or as a separate computing device.

When analyzing the fuel conversion factor, the controller 120 may be configured to recognize that certain circumstances may cause the fuel conversion factor to falsely indicate a fault in the regeneration process. For example, the actual temperature of the exhaust gas measured by the sensor 115 may be used to determine whether the heat generated by the oxidation catalyst 125 is sufficient to heat the particulate filter 130 during the regeneration process so that the particulate matter that has collected on the particulate filter 130 may be removed. As discussed above, the quantity of exhaust gas produced by the engine 105 may affect the success of the regeneration process, and the quantity of exhaust gas produced may be related to the operating state of the engine 105. By way of example, a decrease in the quantity of exhaust gas may limit the ability of the oxidation catalyst 125 to increase the temperature of the exhaust gas, which could result in a false indication of the regeneration process failure. When operating in other operating states, however, the engine 105 may provide a sufficient quantity of exhaust gas to the oxidation catalyst 125, and a lower temperature of the exhaust gas than expected after the exhaust gas passes through the oxidation catalyst 125 may indicate the regeneration process failure. Accordingly, analyzing the fuel conversion factor in light of the operating state of the engine 105 may reduce the number of false indications of regeneration process failures.

To compensate for the operating state of the engine 105, the controller 120 may be configured to analyze the fuel conversion factor differently during different operating states. The fuel conversion factor may be based on, e.g., the actual temperature measured by the sensor 115 and one or more expected temperatures. The controller 120 may be configured to integrate the fuel conversion factor over time to define an integration value during high exothermic states, such as the first operating state of the engine 105. The integration value, therefore, may be used to indicate a continuous deviation of the actual temperature of the exhaust gas in light of one or more expected temperatures over a certain period of time.

Since the fuel conversion factor is based, at least in part, on the actual and expected temperatures, and because the quantity of exhaust gas may affect the actual temperature measured, the controller 120 may be configured to only integrate the fuel conversion factor during high exothermic states (e.g., the first operating state) of the engine 105. During low exothermic states (e.g., the second operating state) of the engine 105, the controller 120 may be configured to either hold the integration value constant until the engine 105 begins operating in one of the high exothermic states again. Alternatively, the controller 120 may be configured to reset (e.g., zero) the integration value each time the engine 105 transitions to one of the low exothermic states.

The fuel conversion factor and the integration value may be based on the actual temperature measured given one or more expected temperatures. The controller 120 may be configured to determine one or more expected temperatures of the exhaust gas based on one or more temperature models. The temperature models may consider various factors such as, e.g., the speed of the engine 105, an ambient temperature, a mass flow rate of the exhaust gas, a quantity of airflow through the engine 105, etc., when used to provide the expected temperature. Moreover, a first temperature model may consider properties of an active oxidation catalyst using, e.g., calibration values while a second temperature model may consider properties of an inert (e.g., missing or defective) oxidation catalyst. The controller 120 may use the first temperature model to generate a first expected temperature and the second temperature model to generate a second expected temperature. The values used in each temperature model may be measured by one or more of the sensors 115, derived by the controller 120, or accessed from, e.g., a look-up table.

In one possible approach, the controller 120 may be configured to determine the fuel conversion factor based on a ratio of the difference between the actual temperature and the second expected temperature to a difference between the first and second expected temperatures. In this example approach, as the oxidation catalyst 125 ages or when the engine 105 is operating in the low exothermic state (e.g., the second operating state), the integration value (e.g., the result of integrating the fuel conversion factor over time) may approach zero since the actual temperature measured begins to approach the temperature that would be expected from an inert oxidation catalyst. As such, the controller 120 may be configured to determine whether to diagnose a regeneration process failure if the integration value is below a predetermined threshold and the engine 105 is operating in the low exothermic state.

Constant transitions between the operating states may make it difficult for the controller 120 to accurately diagnose regeneration process failures. Therefore, the controller 120 may be further configured to count the number of times the engine 105 transitions between the first operating state and the second operating state of the engine 105 during the regeneration process, and if the number of transitions is below a predetermined threshold, the controller 120 may be configured to analyze the fuel conversion factor as described above. However, if the number of transitions exceeds the predetermined threshold, the controller 120 may be configured to abort the regeneration process and reschedule the regeneration process to occur at a later time when it is more likely to succeed.

In general, computing systems and/or devices, such as the controller 120, etc., may employ any of a number of computer operating systems and may include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

Figure 2:
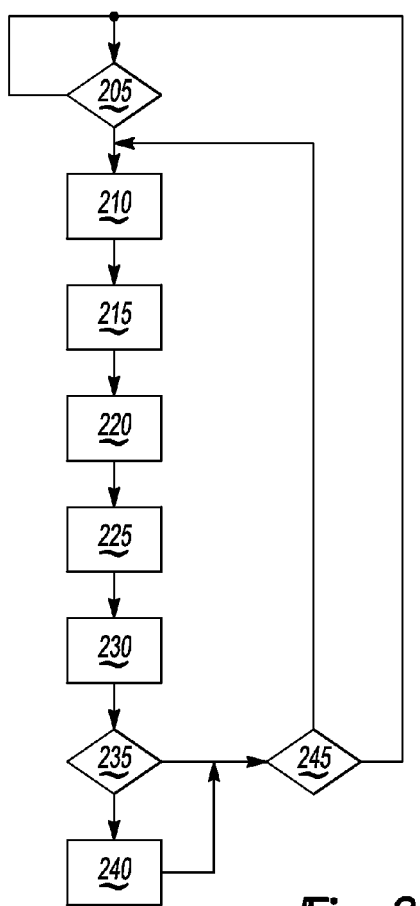
FIG. 2 illustrates a flowchart of an example method implemented by the vehicle to diagnose the fault during the regeneration process.

FIG. 2 illustrates a flowchart of an example process 200 that may be implemented by the controller 120 to diagnose faults during the regeneration process.

At decision block 205, the controller 120 may determine whether the regeneration process has begun. This way, the controller 120 may conserve resources and only perform the remainder of this diagnostic process 200 during the regeneration process. If the regeneration process has begun, the process 200 may continue at block 210. If not, the process 200 may return to decision block 205 to wait for the regeneration process to begin.

At block 210, the controller 120 may identify the operating state of the engine 105. The operating state may be determined based on, e.g., the speed of the engine 105, the commanded torque from the engine control module or the controller 120, which, as described above, may be the same computing device. For simplicity, only two operating states, a high exothermic state (e.g., the first operating state) and a low exothermic state (e.g., the second operating state) are described with reference to FIG. 2. However, the controller 120 may be configured to distinguish between more than two operating states of the engine 105.

At block 215, the controller 120 may determine the actual temperature of the exhaust gas during the regeneration process. For instance, the controller 120 may receive the temperature signal from the sensor 115 and determine the actual temperature of the exhaust gas based on the temperature signal.

At block 220, the controller 120 may determine the expected temperature (e.g., the first expected temperature, the second expected temperature, or both) of the exhaust gas. The controller 120 may use the first temperature model to determine the first expected temperature based, at least in part, on properties of an active oxidation catalyst and the controller 120 may use the second temperature model to determine the second expected temperature based, at least in part, on properties of an inert (e.g., missing or defective) oxidation catalyst. The controller 120 may derive or measure the values used in the first temperature model, the second temperature model, or both, based on signals received from the sensor 115 or from a look-up table.

At block 225, the controller 120 may define the fuel conversion factor based on the actual temperature measured above at block 215 and one or more of the expected temperatures determined at block 220. For instance, the fuel conversion factor may be based upon a ratio of the difference between the actual temperature and the second expected temperature to the difference between the first expected temperature and the second expected temperature.

At block 230, the controller 120 may analyze the fuel conversion factor over time relative to the operating state of the engine 105 identified at block 210. For instance, the controller 120 may integrate the fuel conversion factor during the regeneration process to define the integration value. As discussed in greater detail below with respect to FIGS. 3 and 4, the controller 120 may continue to integrate the fuel conversion factor during the first operating state to update the integration value and either hold or reset the integration value during the second operating state. This way, the low quantity of exhaust gas produced during the second operating state will not adversely affect the fuel conversion factor analysis.

At decision block 235, the controller 120 may compare the integration value to a predetermined value. The predetermined value may represent a minimum magnitude of the integration value that indicates proper execution of the regeneration process. If the controller 120 determines that the integration value determined at block 230 is below the predetermined value, the process 200 may continue at block 240. If, however, the controller 120 determines that the integration value is above the predetermined value, the process 200 may continue at block 245.

At block 240, the controller 120 may diagnose a fault in the regeneration process based, at least in part, on the fuel conversion factor via, e.g., the integration value. In response, the controller 120 may take a remedial action such as illuminate an indicator light so that an operator of the system 100 may investigate the failure and, if necessary, replace one or more components of the exhaust system 110.

At decision block 245, the controller 120 may determine whether the regeneration process is over. If so, the process 200 may return to decision block 205 to wait for the next regeneration process to begin. If the regeneration process is not over, the process 200 may continue at block 210 so that the controller 120 may update the operating state of the engine 105 and continue to analyze the fuel conversion factor in light of the updated operating state.

Figure 3:
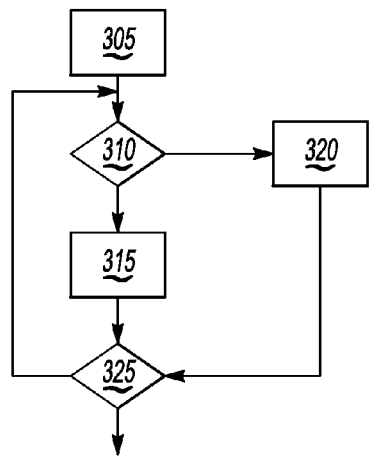
FIG. 3 illustrates a flowchart of one example method implemented by the vehicle to analyze a fuel conversion factor during the regeneration process.

FIG. 3 illustrates an example process 300 of analyzing the fuel conversion factor during the regeneration process. The controller 120 may use the process 300 at block 230 of FIG. 2 to generate the integration value.

At block 305, the controller 120 may integrate the fuel conversion factor over time during the first operating state to define the integration value. As discussed above, the integration value may be used to indicate a continuous deviation of the actual temperature of the exhaust gas in light of one or more expected temperatures over a certain period of time.

At decision block 310, the controller 120 may determine whether the operating state of the engine 105 has changed. Since the operating state of the engine 105 may affect the validity of the fuel conversion factor, and thus, the integration value, the controller 120 may continuously determine whether the initial identification of the operating state (e.g., such as at block 210 of FIG. 2) is the current operating state of the engine 105 for a predetermined amount of time before analyzing the fuel conversion factor. If the controller 120 determines that the engine 105 continues to operate in or has transitioned to the first operating state, the process 300 may continue at block 315. If, however, the controller 120 determines that the engine 105 continues to operate in or has transitioned to the second operating state, the process 300 may continue at block 320.

At block 315, the controller 120 may update the integration value by, e.g., beginning or continuing to integrate the fuel conversion factor. Since the controller 120 has determined that the engine 105 is operating in the high exothermic state (e.g., the first operating state), the controller 120 may determine that the fuel conversion factor, and thus, the integration value are accurate representations of the success of the regeneration process.

At block 320, the controller 120 may hold the integration value constant during the second operating state. As previously discussed, the second operating state may represent a low exothermic state of the engine 105. During the second operating state, the fuel conversion factor and the integration value may not accurately represent the success of the regeneration process. As such, the controller 120 may hold the integration value constant while the engine 105 operates in the second operating state so that the fuel conversion factor and integration values during the time the engine 105 is operating in the second operating state will not provide a false indication of a regeneration process failure.

At decision block 325, the controller 120 may determine whether a predetermined amount of time has elapsed. If not, the process 300 may return to block 310 so that the controller 120 may determine the operating state of the engine 105. If the predetermined amount of time has elapsed, the process 300 may end, and the most recent integration value (e.g., determined at block 315 or held at block 320) may be used to diagnose the regeneration process failure using, e.g., blocks 235 and 240 of FIG. 2.

Figure 4:
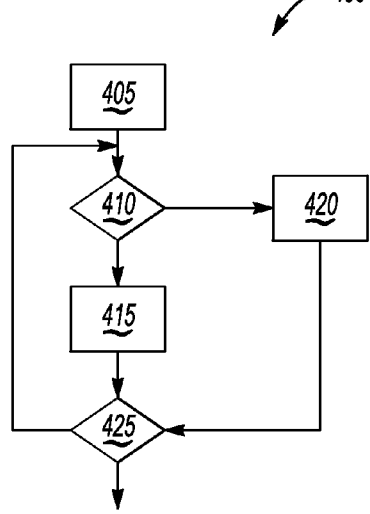
FIG. 4 illustrates a flowchart of another example method implemented by the vehicle to analyze the fuel conversion factor during the regeneration process.

FIG. 4 illustrates a flowchart of an example process 400 that may be used by the controller 120 to analyze the fuel conversion factor during the regeneration process. Like the process 300 of FIG. 3, the controller 120 may use the process 400 at block 230 of FIG. 2 to generate the integration value.

At block 405, the controller 120 may integrate the fuel conversion factor over time during the first operating state to define the integration value.

At decision block 410, the controller 120 may determine whether the operating state of the engine 105 has changed. If the controller 120 determines that the engine 105 continues to operate in or has transitioned to the first operating state, the process 400 may continue at block 415. If, however, the controller 120 determines that the engine 105 continues to operate in or has transitioned to the second operating state, the process 400 may continue at block 420.

At block 415, the controller 120 may update the integration value by, e.g., beginning or continuing to integrate the fuel conversion factor. Since the controller 120 has determined that the engine 105 is operating in the high exothermic state (e.g., the first operating state), the controller 120 may determine that the fuel conversion factor, and thus, the integration value are accurate representations of the success of the regeneration process.

At block 420, the controller 120 may reset (e.g., zero) the integration value at each transition from the first operating state to the second operating state since, during the second operating state, the fuel conversion factor, and thus, the integration value, may not accurately represent the success of the regeneration process.

At decision block 425, the controller 120 may determine whether a predetermined amount of time has elapsed. If not, the process 400 may return to block 410 so that the controller 120 may continue to detect changes in the operating state of the engine 105. If the predetermined amount of time has elapsed, the process 400 may end so that the most recent integration value (e.g., determined at block 415 or reset at block 420) may be used to diagnose the regeneration process failure using, e.g., blocks 235 and 240 of FIG. 2.

While the best modes for carrying out the invention have been described in detail, those familiar with the art to which this invention relates will recognize various alternative designs and embodiments for practicing the invention within the scope of the appended claims.

The invention claimed is:

1. A system comprising:
an engine configured to operate in a first operating state and a second operating state;
a particulate filter configured to receive exhaust gas from the engine and filter particulate matter from the exhaust gas;
an oxidation catalyst configured to generate heat to increase a temperature of the exhaust gas during a regeneration process;
a sensor configured to measure an actual temperature of the exhaust gas during the regeneration process; and
a controller configured to:
calculate a fuel conversion factor, the fuel conversion factor representing a ratio of a difference between a first expected temperature of the exhaust gas and a second expected temperature of the exhaust gas to a difference between the actual temperature and the second expected temperature of the exhaust gas;
integrate the fuel conversion factor during the regeneration process to define an integration value when the engine is operating in the first operating state;
at least one of hold the integration value constant and reset the integration value when the engine is operating in the second operating state;
compare the integration value to a predetermined value; and
provide an indication if the integration value is less than the predetermined value.

2. A system as set forth in claim 1, wherein the controller is configured to count a number of transitions between the first operating state and the second operating state during the regeneration process.

3. A system as set forth in claim 2, wherein the controller is configured to integrate the fuel conversion factor over time if the number of transitions is below a predetermined threshold.

4. A system as set forth in claim 1, wherein the controller is configured to determine the difference between a first expected temperature of the exhaust gas and a second expected temperature of the exhaust gas based on at least one of a speed of the engine, an ambient temperature, a mass flow rate of the exhaust gas, and an airflow through the engine.

5. A system as set forth in claim 1, wherein the controller is configured to determine the difference between a first expected temperature of the exhaust gas and a second expected temperature of the exhaust gas based at least in part on a first temperature model and a second temperature model.

6. A system as set forth in claim 5, wherein the controller is configured to use the first temperature model to determine a first expected temperature based on an active oxidation catalyst and the second temperature model to determine a second expected temperature based on an inert oxidation catalyst.

7. A method comprising:
determining, via a computing device, an actual temperature increase of exhaust gas attributable to a regeneration process;
determining an expected temperature increase of the exhaust gas attributable to the regeneration process;
defining a fuel conversion factor as a ratio of a difference between a first expected temperature of the exhaust gas and a second expected temperature of the exhaust gas to a difference between the actual temperature and the second expected temperature of the exhaust gas;
identifying an operating state of an engine;
integrating the fuel conversion factor over time while the engine is in a first operating state to determine an integration value;
holding the integration value constant or resetting the integration value while the engine is in a second operating state;
comparing the integration value to a predetermined value; and
diagnosing a fault in the regeneration process if the integration value is less than the predetermined value.

8. A method as set forth in claim 7, wherein determining the difference between a first expected temperature of the exhaust gas and a second expected temperature of the exhaust gas includes:
determining a first expected temperature based on a first temperature model;
determining a second expected temperature based on a second temperature model; and
determining a difference between the first expected temperature and the second expected temperature.

9. A vehicle comprising:
an engine configured to operate in a plurality of operating states to generate rotational motion, wherein the plurality of operating states includes a first operating state and a second operating state;
a particulate filter in fluid communication with the engine and configured to receive exhaust gas from the engine and filter particulate matter from the exhaust gas;
an oxidation catalyst in fluid communication with the engine and configured to generate heat to increase a temperature of the exhaust gas during a regeneration process;
a sensor configured to measure an actual temperature of the exhaust gas output by the oxidation catalyst during the regeneration process; and
a controller configured to define a fuel conversion factor based at least in part on a ratio of a difference between a first expected temperature of the exhaust gas and a second expected temperature of the exhaust gas to a difference between the actual temperature and the second expected temperature of the exhaust gas, wherein the first expected temperature is based on an expected temperature of an active oxidation catalyst and the second expected temperature is based on an expected temperature of an inert oxidation catalyst;
wherein the controller is configured to integrate the fuel conversion factor over time when the engine is operating in the first operating state to define an integration value and hold or reset the integration value when the engine is operating in the second operating state; and
wherein the controller is configured to diagnose a fault in the regeneration process based at least in part on the integration value.

10. The system as set forth in claim 1, wherein the engine generates more of the exhaust gas in the first operating state than in the second operating state; and wherein the engine performs more work in the first operating state than in the second operating state.

11. The system as set forth in claim 1, wherein the indication is indicative of a fault in the regeneration process.

12. The vehicle as set forth in claim 9, wherein the engine generates more of the exhaust gas in the first operating state than in the second operating state; and wherein the engine performs more work in the first operating state than in the second operating state.

\* \* \* \* \*